(12) United States Patent
Wilkinson et al.

(10) Patent No.: US 12,239,098 B2
(45) Date of Patent: Mar. 4, 2025

(54) DETERMINING THE LOCATION OF AN ANIMAL

(71) Applicant: ALLFLEX AUSTRALIA PTY LTD, Queensland (AU)

(72) Inventors: Benjamin Thomas John Wilkinson, Queensland (AU); Brian Antony Clayton, Queensland (AU)

(73) Assignee: ALLFLEX AUSTRALIA PTY LTD, Queensland (AU)

( * ) Notice: Subject to any disclaimer, the term of this patent is extended or adjusted under 35 U.S.C. 154(b) by 0 days.

(21) Appl. No.: 17/429,559

(22) PCT Filed: Feb. 8, 2019

(86) PCT No.: PCT/AU2019/050093
§ 371 (c)(1),
(2) Date: Aug. 9, 2021

(87) PCT Pub. No.: WO2020/160588
PCT Pub. Date: Aug. 13, 2020

(65) Prior Publication Data
US 2022/0117197 A1    Apr. 21, 2022

(51) Int. Cl.
*A01K 11/00* (2006.01)
*G01S 5/02* (2010.01)
(Continued)

(52) U.S. Cl.
CPC .......... *A01K 11/006* (2013.01); *G01S 5/0289* (2013.01); *G01S 5/0295* (2020.05);
(Continued)

(58) Field of Classification Search
CPC ....... A01K 11/006; A22B 7/001; G01S 11/06; G01S 2205/01; G01S 5/0221;
(Continued)

(56) References Cited

U.S. PATENT DOCUMENTS

| 85,575 A | 1/1869 | Mexworth |
| 1,016,752 A | 2/1912 | Leith |

(Continued)

FOREIGN PATENT DOCUMENTS

| AU | 199534570 | 10/1994 |
| AU | 2003239832 | 5/2002 |

(Continued)

OTHER PUBLICATIONS

International Search Report and Written Opinion for International (PCT) Patent Application No. PCT/AU2019/050093, dated Apr. 16, 2019, 8 pages.

(Continued)

*Primary Examiner* — Omer S Khan
(74) *Attorney, Agent, or Firm* — Keith O'Doherty; Jenny Cromsigt (57) ABSTRACT

Approaches for determining a location of an animal based on RSSI. An embodiment includes a method, comprising: receiving a first reading of an electronic animal identification tag attached to an animal from a first electronic tag reader; calculating a received signal strength indicator (RSSI) for the first reading; and determining a location of the animal based on the RSSI. Another embodiment includes a method, comprising: receiving a first reading of a first electronic animal identification tag attached to a first animal; calculating a received signal strength indicator (RSSI) for the first reading; receiving a second reading of a second 10 electronic animal identification tag attached to a second animal; calculating an RSSI for the second reading; and determining the location of the first animal based on the RSSI of the first reading and the RSSI of the second reading.

12 Claims, 3 Drawing Sheets

(51) Int. Cl.
  *G01S 11/06* (2006.01)
  *G06K 7/10* (2006.01)
(52) U.S. Cl.
  CPC .......... *G01S 11/06* (2013.01); *G06K 7/10366* (2013.01); *G01S 2205/01* (2020.05)
(58) Field of Classification Search
  CPC ............... G01S 5/0289; G01S 5/0295; G06K 7/0008; G06K 7/10009; G06K 7/10128; G06K 7/10366; G06K 7/10425; H04B 17/27; H04B 17/318; H04B 5/0056; H04W 4/029
  See application file for complete search history.

(56) References Cited

U.S. PATENT DOCUMENTS

| | | |
|---|---|---|
| 1,188,510 A | 6/1916 | Timson |
| 1,364,137 A | 1/1921 | Pannier |
| 1,759,400 A | 5/1930 | Hobbs |
| 1,843,314 A | 2/1932 | Berntson et al. |
| 1,863,037 A | 6/1932 | Archbold |
| 2,078,827 A | 4/1937 | Ketchum |
| 2,420,020 A | 5/1947 | Snell |
| 2,553,400 A | 5/1951 | Blair |
| 2,570,048 A | 10/1951 | Cooke et al. |
| 3,091,770 A | 6/1963 | McMurray et al. |
| 3,261,243 A | 7/1966 | Ellison |
| 3,596,541 A | 8/1971 | Bieganski |
| 3,812,859 A | 5/1974 | Murphy |
| 3,884,100 A | 5/1975 | Fideldy |
| 3,981,209 A | 9/1976 | Caroff |
| 4,120,303 A | 10/1978 | Villa-Massone et al. |
| 4,121,591 A | 10/1978 | Hayes |
| 4,281,657 A | 8/1981 | Ritchey |
| 4,323,183 A | 4/1982 | Duchin |
| 4,497,321 A | 2/1985 | Fearing et al. |
| 4,516,577 A | 5/1985 | Scott et al. |
| 4,531,520 A | 7/1985 | Reggers et al. |
| 4,552,147 A | 11/1985 | Gardner |
| 4,666,436 A | 5/1987 | McDonald et al. |
| 4,672,966 A | 6/1987 | Haas, Jr. |
| 4,696,119 A | 9/1987 | Howe et al. |
| 4,716,899 A | 1/1988 | Huenefeld |
| 4,819,639 A | 4/1989 | Gardner |
| 4,821,683 A | 4/1989 | Veldman |
| 4,878,302 A | 11/1989 | Jowsey |
| 4,943,294 A | 7/1990 | Knapp |
| 5,022,253 A | 6/1991 | Parlatore |
| 5,056,385 A | 10/1991 | Petersen |
| 5,141,514 A | 8/1992 | Van |
| 5,154,721 A | 10/1992 | Perez |
| 5,267,464 A | 12/1993 | Cleland |
| 5,509,291 A | 4/1996 | Nilsson |
| D377,588 S | 1/1997 | Birkholz |
| 5,651,791 A | 7/1997 | Zavlodaver et al. |
| 5,778,820 A | 7/1998 | van der Lely et al. |
| 5,898,367 A * | 4/1999 | Berube ................ G08B 25/009 340/8.1 |
| 6,007,548 A | 12/1999 | Ritchey |
| 6,016,769 A | 1/2000 | Forster |
| 6,043,748 A | 3/2000 | Touchton et al. |
| 6,053,926 A | 4/2000 | Luehrs |
| 6,095,915 A | 8/2000 | Battista et al. |
| 6,099,482 A | 8/2000 | Brune et al. |
| 6,100,804 A | 8/2000 | Brady et al. |
| 6,113,539 A | 9/2000 | Ridenour |
| 6,114,957 A | 9/2000 | Westrick et al. |
| 6,145,225 A | 11/2000 | Ritchey |
| 6,166,643 A | 12/2000 | Janning et al. |
| 6,172,640 B1 | 1/2001 | Durst et al. |
| 6,232,880 B1 | 5/2001 | Anderson et al. |
| 6,235,036 B1 | 5/2001 | Gardner et al. |
| 6,271,757 B1 | 8/2001 | Touchton et al. |
| 6,297,739 B1 | 10/2001 | Small |
| 6,310,553 B1 | 10/2001 | Dance |
| 6,402,692 B1 | 6/2002 | Morford |
| 6,497,197 B1 | 12/2002 | Huisma |
| 6,502,060 B1 | 12/2002 | Christian |
| 6,510,630 B1 | 1/2003 | Gardner |
| 6,535,131 B1 | 3/2003 | Bar-Shalom et al. |
| 6,569,092 B1 | 5/2003 | Booker |
| 6,659,039 B1 | 12/2003 | Larsen |
| 6,772,556 B1 | 8/2004 | Liu |
| 6,868,804 B1 | 3/2005 | Huisma et al. |
| 7,016,730 B2 | 3/2006 | Ternes |
| 7,046,152 B1 | 5/2006 | Peinetti et al. |
| 7,137,359 B1 | 11/2006 | Braden |
| 7,296,539 B2 | 11/2007 | Iljas |
| 7,380,518 B2 | 6/2008 | Kates |
| D584,121 S | 1/2009 | Fancelli |
| 7,705,736 B1 | 4/2010 | Kedziora |
| 7,772,979 B2 | 8/2010 | Caisley |
| 7,843,350 B2 | 11/2010 | Geissler et al. |
| 7,937,861 B1 | 5/2011 | Zacher |
| 8,005,624 B1 | 8/2011 | Starr |
| 8,266,990 B1 | 9/2012 | Janson |
| 8,305,220 B2 | 11/2012 | Gibson |
| 8,314,687 B2 | 11/2012 | Yelle et al. |
| 8,478,389 B1 | 7/2013 | Brockway et al. |
| 8,622,929 B2 | 1/2014 | Berrell et al. |
| 8,763,557 B2 | 7/2014 | Lipscomb et al. |
| 8,955,462 B1 | 2/2015 | Golden et al. |
| 8,979,757 B2 | 3/2015 | Mottram et al. |
| 9,215,862 B2 | 12/2015 | Bladen |
| 9,392,767 B2 | 7/2016 | Talt et al. |
| 9,392,946 B1 | 7/2016 | Sarantos et al. |
| 9,449,487 B1 | 9/2016 | Spitalny |
| 9,648,849 B1 | 5/2017 | Vivathana |
| 9,654,925 B1 | 5/2017 | Solinsky et al. |
| 9,693,536 B1 | 7/2017 | Dana |
| 9,717,216 B1 | 8/2017 | Schlachta et al. |
| 9,743,643 B1 | 8/2017 | Kaplan et al. |
| 9,848,577 B1 | 12/2017 | Brandao |
| 9,861,080 B1 | 1/2018 | Hathway et al. |
| D818,783 S | 5/2018 | Wermeille |
| 10,004,204 B2 | 6/2018 | Hayes et al. |
| D823,079 S | 7/2018 | Lyytikainen |
| 10,021,857 B2 | 7/2018 | Bailey et al. |
| 10,039,263 B2 | 8/2018 | Teychene et al. |
| 10,045,511 B1 | 8/2018 | Yarden et al. |
| 10,064,391 B1 | 9/2018 | Riley |
| 10,091,972 B1 | 10/2018 | Jensen |
| 10,123,297 B1 | 11/2018 | Harney et al. |
| 10,231,442 B1 | 3/2019 | Chang et al. |
| 10,242,547 B1 | 3/2019 | Struhsaker |
| 10,264,762 B1 | 4/2019 | Lamb |
| 10,352,759 B1 | 7/2019 | Jensen |
| 10,446,006 B1 | 10/2019 | Johnson, Jr. et al. |
| 10,512,430 B1 | 12/2019 | Hladio |
| 10,588,295 B1 | 3/2020 | Riley |
| 10,628,756 B1 | 4/2020 | Kuper et al. |
| 10,638,726 B1 | 5/2020 | Makarychev et al. |
| 10,691,674 B2 | 6/2020 | Leong et al. |
| 2001/0027751 A1 | 10/2001 | van den Berg |
| 2002/0010390 A1 | 1/2002 | Guice et al. |
| 2002/0021219 A1 | 2/2002 | Edwards |
| 2002/0091326 A1 | 7/2002 | Hashimoto et al. |
| 2002/0095828 A1 | 7/2002 | Koopman et al. |
| 2002/0154015 A1 | 10/2002 | Hixson |
| 2002/0158765 A1 | 10/2002 | Pape |
| 2003/0004652 A1 | 1/2003 | Brunner et al. |
| 2003/0023517 A1 | 1/2003 | Marsh et al. |
| 2003/0028327 A1 | 2/2003 | Brunner et al. |
| 2003/0062001 A1 | 4/2003 | Andersson |
| 2003/0066491 A1 | 4/2003 | Stampe |
| 2003/0144926 A1 | 7/2003 | Bodin et al. |
| 2003/0146284 A1 | 8/2003 | Schmit et al. |
| 2003/0149526 A1 | 8/2003 | Zhou et al. |
| 2003/0177025 A1 | 9/2003 | Curkendall et al. |
| 2003/0201931 A1 | 10/2003 | Durst et al. |
| 2003/0208157 A1 | 11/2003 | Eidson et al. |
| 2003/0221343 A1 | 12/2003 | Volk et al. |
| 2003/0229452 A1 | 12/2003 | Lewis |

(56) References Cited

U.S. PATENT DOCUMENTS

| | | |
|---|---|---|
| 2004/0066298 A1 | 4/2004 | Schmitt et al. |
| 2004/0078390 A1 | 4/2004 | Saunders |
| 2004/0118920 A1 | 6/2004 | He |
| 2004/0123810 A1 | 7/2004 | Lorton |
| 2004/0177011 A1 | 9/2004 | Ramsay et al. |
| 2004/0201454 A1 | 10/2004 | Waterhouse et al. |
| 2005/0010333 A1 | 1/2005 | Lorton |
| 2005/0026181 A1 | 2/2005 | Davis et al. |
| 2005/0097997 A1 | 5/2005 | Hile |
| 2005/0108912 A1 | 5/2005 | Bekker |
| 2005/0115508 A1 | 6/2005 | Little |
| 2005/0128086 A1 | 6/2005 | Brown et al. |
| 2005/0139168 A1 | 6/2005 | Light et al. |
| 2005/0145187 A1 | 7/2005 | Gray |
| 2005/0164621 A1* | 7/2005 | Christensen ............ A22B 1/00 452/57 |
| 2005/0273117 A1 | 12/2005 | Teychene |
| 2005/0279287 A1 | 12/2005 | Kroeker |
| 2005/0284381 A1 | 12/2005 | Bell et al. |
| 2006/0011145 A1 | 1/2006 | Kates |
| 2006/0052986 A1 | 3/2006 | Rogers et al. |
| 2006/0064325 A1 | 3/2006 | Matsumoto et al. |
| 2006/0087440 A1 | 4/2006 | Klein |
| 2006/0106289 A1 | 5/2006 | Elser |
| 2006/0117619 A1 | 6/2006 | Costantini |
| 2006/0155172 A1 | 7/2006 | Rugg |
| 2006/0170561 A1 | 8/2006 | Eyal |
| 2006/0173367 A1 | 8/2006 | Stuart et al. |
| 2006/0185605 A1 | 8/2006 | Renz et al. |
| 2006/0201436 A1 | 9/2006 | Kates |
| 2006/0207515 A1 | 9/2006 | Palett |
| 2006/0241521 A1 | 10/2006 | Cohen |
| 2006/0253416 A1* | 11/2006 | Takatsu ................. H04L 69/329 |
| 2006/0282274 A1 | 12/2006 | Bennett |
| 2006/0290514 A1 | 12/2006 | Sakama et al. |
| 2007/0006494 A1 | 1/2007 | Hayes et al. |
| 2007/0008155 A1 | 1/2007 | Trost et al. |
| 2007/0021660 A1 | 1/2007 | DeLonzor et al. |
| 2007/0027375 A1 | 2/2007 | Melker et al. |
| 2007/0027377 A1 | 2/2007 | DeLonzor et al. |
| 2007/0027379 A1 | 2/2007 | DeLonzor et al. |
| 2007/0029381 A1 | 2/2007 | Morrisugi et al. |
| 2007/0044317 A1 | 3/2007 | Critelli |
| 2007/0044732 A1 | 3/2007 | Araki et al. |
| 2007/0062457 A1 | 3/2007 | Bates et al. |
| 2007/0069899 A1 | 3/2007 | Shih et al. |
| 2007/0103296 A1 | 5/2007 | Paessel et al. |
| 2007/0149871 A1 | 6/2007 | Sarussi et al. |
| 2007/0152825 A1 | 7/2007 | August et al. |
| 2007/0222624 A1 | 9/2007 | Eicken et al. |
| 2007/0255124 A1 | 11/2007 | Pologe et al. |
| 2007/0258625 A1 | 11/2007 | Mirtsching |
| 2007/0283791 A1 | 12/2007 | Engvall et al. |
| 2007/0298421 A1 | 12/2007 | Jiang et al. |
| 2008/0001815 A1 | 1/2008 | Wang et al. |
| 2008/0004798 A1 | 1/2008 | Troxler et al. |
| 2008/0017126 A1 | 1/2008 | Adams et al. |
| 2008/0018481 A1 | 1/2008 | Zehavi |
| 2008/0021352 A1 | 1/2008 | Keegan et al. |
| 2008/0036610 A1 | 2/2008 | Hokuf et al. |
| 2008/0047177 A1 | 2/2008 | Hilpert |
| 2008/0055155 A1 | 3/2008 | Hensley et al. |
| 2008/0059263 A1 | 3/2008 | Stroman |
| 2008/0061990 A1 | 3/2008 | Milnes et al. |
| 2008/0076988 A1 | 3/2008 | Sarussi et al. |
| 2008/0076992 A1 | 3/2008 | Hete et al. |
| 2008/0085522 A1 | 4/2008 | Meghen et al. |
| 2008/0097726 A1 | 4/2008 | Lorton |
| 2008/0110406 A1 | 5/2008 | Anderson et al. |
| 2008/0146890 A1 | 6/2008 | LeBoeuf et al. |
| 2008/0173255 A1 | 7/2008 | Mainini et al. |
| 2008/0190202 A1 | 8/2008 | Kulach et al. |
| 2008/0190379 A1 | 8/2008 | Mainini et al. |
| 2008/0215484 A1 | 9/2008 | Oldham |
| 2008/0218357 A1 | 9/2008 | March |
| 2008/0227662 A1 | 9/2008 | Stromberg et al. |
| 2008/0228105 A1 | 9/2008 | Howell et al. |
| 2008/0262326 A1 | 10/2008 | Hete et al. |
| 2008/0272908 A1 | 11/2008 | Boyd |
| 2008/0312511 A1 | 12/2008 | Osler et al. |
| 2008/0314325 A1 | 12/2008 | Hempstead et al. |
| 2009/0009388 A1 | 1/2009 | Wangrud |
| 2009/0020613 A1 | 1/2009 | Chang et al. |
| 2009/0025651 A1 | 1/2009 | Lalor |
| 2009/0058730 A1 | 3/2009 | Geissler et al. |
| 2009/0094869 A1 | 4/2009 | Geissler et al. |
| 2009/0102668 A1 | 4/2009 | Thompson et al. |
| 2009/0139462 A1 | 6/2009 | So |
| 2009/0149727 A1 | 6/2009 | Truitt et al. |
| 2009/0187392 A1 | 7/2009 | Riskey et al. |
| 2009/0255484 A1 | 10/2009 | Muelken |
| 2009/0312667 A1 | 12/2009 | Utsunomiya et al. |
| 2010/0018363 A1 | 1/2010 | Chervenak et al. |
| 2010/0030036 A1 | 2/2010 | Mottram et al. |
| 2010/0045468 A1 | 2/2010 | Geissler |
| 2010/0107985 A1 | 5/2010 | O'Hare |
| 2010/0113902 A1 | 5/2010 | Hete et al. |
| 2010/0139575 A1 | 6/2010 | Duncan et al. |
| 2010/0160809 A1 | 6/2010 | Laurence et al. |
| 2010/0175625 A1 | 7/2010 | Klenotiz |
| 2010/0217102 A1 | 8/2010 | Leboeuf et al. |
| 2010/0250198 A1 | 9/2010 | Lorton |
| 2010/0289639 A1 | 11/2010 | Gibson et al. |
| 2010/0315241 A1 | 12/2010 | Jow |
| 2010/0321182 A1 | 12/2010 | Wangrud |
| 2010/0321189 A1 | 12/2010 | Gibson et al. |
| 2010/0331739 A1 | 12/2010 | Afikim et al. |
| 2011/0018717 A1 | 1/2011 | Takahashi et al. |
| 2011/0041367 A1 | 2/2011 | Bladen et al. |
| 2011/0061605 A1 | 3/2011 | Hardi et al. |
| 2011/0095089 A1 | 4/2011 | Kolton et al. |
| 2011/0121356 A1 | 5/2011 | Krawinkel et al. |
| 2011/0137185 A1 | 6/2011 | Hete et al. |
| 2011/0152876 A1 | 6/2011 | Vandeputte |
| 2011/0178423 A1 | 7/2011 | Hatch |
| 2011/0203144 A1 | 8/2011 | Junek et al. |
| 2011/0258130 A1 | 10/2011 | Grabiner et al. |
| 2011/0272470 A1 | 11/2011 | Baba et al. |
| 2011/0313264 A1 | 12/2011 | Hete |
| 2012/0009943 A1 | 1/2012 | Greenberg et al. |
| 2012/0062381 A1 | 3/2012 | Liu |
| 2012/0065483 A1 | 3/2012 | Chung |
| 2012/0068848 A1 | 3/2012 | Campbell et al. |
| 2012/0089152 A1 | 4/2012 | Lynd et al. |
| 2012/0092132 A1 | 4/2012 | Holme et al. |
| 2012/0111286 A1 | 5/2012 | Lee et al. |
| 2012/0112917 A1 | 5/2012 | Menachem et al. |
| 2012/0160181 A1 | 6/2012 | So et al. |
| 2012/0175412 A1 | 7/2012 | Grabiner et al. |
| 2012/0204811 A1 | 8/2012 | Ryan |
| 2012/0236690 A1 | 9/2012 | Rader et al. |
| 2012/0291715 A1 | 11/2012 | Jiang et al. |
| 2012/0299731 A1 | 11/2012 | Triener |
| 2012/0325153 A1 | 12/2012 | Mostert |
| 2012/0326862 A1 | 12/2012 | Kwak et al. |
| 2012/0326874 A1 | 12/2012 | Kwak et al. |
| 2013/0006065 A1 | 1/2013 | Yanai et al. |
| 2013/0014706 A1 | 1/2013 | Menkes |
| 2013/0046170 A1 | 2/2013 | Haynes |
| 2013/0113622 A1 | 5/2013 | Pratt et al. |
| 2013/0119142 A1 | 5/2013 | Mccoy et al. |
| 2013/0175347 A1 | 7/2013 | Decaluwe et al. |
| 2013/0181834 A1 | 7/2013 | Bentley et al. |
| 2013/0192526 A1 | 8/2013 | Mainini |
| 2013/0211773 A1 | 8/2013 | Loeschinger et al. |
| 2013/0222141 A1 | 8/2013 | Rhee et al. |
| 2013/0237778 A1 | 9/2013 | Rouquette et al. |
| 2013/0239904 A1 | 9/2013 | Kim et al. |
| 2013/0239907 A1 | 9/2013 | Laurence et al. |
| 2013/0265165 A1 | 10/2013 | So et al. |
| 2013/0282295 A1 | 10/2013 | White et al. |
| 2013/0285815 A1 | 10/2013 | Jones, II |
| 2014/0073486 A1 | 3/2014 | Ahmed et al. |
| 2014/0122488 A1 | 5/2014 | Jung et al. |

(56) References Cited

U.S. PATENT DOCUMENTS

| | | |
|---|---|---|
| 2014/0123912 A1 | 5/2014 | Menkes et al. |
| 2014/0135596 A1 | 5/2014 | Leboeuf et al. |
| 2014/0135631 A1 | 5/2014 | Brumback et al. |
| 2014/0171762 A1 | 6/2014 | Leboeuf et al. |
| 2014/0174376 A1 | 6/2014 | Touchton et al. |
| 2014/0196673 A1 | 7/2014 | Menkes et al. |
| 2014/0230755 A1 | 8/2014 | Trenkle et al. |
| 2014/0232541 A1 | 8/2014 | Trenkle et al. |
| 2014/0253709 A1 | 9/2014 | Bresch et al. |
| 2014/0261235 A1 | 9/2014 | Rich et al. |
| 2014/0267299 A1 | 9/2014 | Couse |
| 2014/0275824 A1 | 9/2014 | Couse |
| 2014/0276089 A1 | 9/2014 | Kirenko et al. |
| 2014/0290013 A1 | 10/2014 | Eidelman et al. |
| 2014/0302783 A1 | 10/2014 | Aiuto et al. |
| 2014/0331942 A1 | 11/2014 | Sarazyn |
| 2014/0333439 A1 | 11/2014 | Downing et al. |
| 2014/0347184 A1 | 11/2014 | Triener |
| 2014/0352632 A1 | 12/2014 | Mclaughlin |
| 2014/0368338 A1 | 12/2014 | Rettedal et al. |
| 2015/0025394 A1 | 1/2015 | Hong et al. |
| 2015/0039239 A1 | 2/2015 | Shuler et al. |
| 2015/0057963 A1 | 2/2015 | Zakharov et al. |
| 2015/0097668 A1 | 4/2015 | Toth |
| 2015/0099472 A1 | 4/2015 | Ickovic |
| 2015/0100245 A1 | 4/2015 | Huang et al. |
| 2015/0107519 A1 | 4/2015 | Rajkondawar et al. |
| 2015/0107522 A1 | 4/2015 | Lamb |
| 2015/0109130 A1 | 4/2015 | Rajkondawar et al. |
| 2015/0122893 A1 | 5/2015 | Vanguard |
| 2015/0128873 A1 | 5/2015 | Prescott et al. |
| 2015/0130617 A1 | 5/2015 | Triener |
| 2015/0148811 A1 | 5/2015 | Swope et al. |
| 2015/0157435 A1 | 6/2015 | Chasins et al. |
| 2015/0182322 A1 | 7/2015 | Couse et al. |
| 2015/0245592 A1 | 9/2015 | Sibbald et al. |
| 2015/0282457 A1 | 10/2015 | Yarden |
| 2015/0334994 A1 | 11/2015 | Prasad |
| 2015/0342143 A1 | 12/2015 | Stewart |
| 2015/0351885 A1 | 12/2015 | Kool et al. |
| 2015/0366166 A1 | 12/2015 | Mueller |
| 2016/0000045 A1 | 1/2016 | Funaya et al. |
| 2016/0021506 A1 | 1/2016 | Bonge, Jr. |
| 2016/0058379 A1 | 3/2016 | Menkes et al. |
| 2016/0066546 A1 | 3/2016 | Borchersen et al. |
| 2016/0100802 A1 | 4/2016 | Newman |
| 2016/0106064 A1 | 4/2016 | Bladen et al. |
| 2016/0113524 A1 | 4/2016 | Gross et al. |
| 2016/0120154 A1 | 5/2016 | Hill et al. |
| 2016/0128637 A1 | 5/2016 | Leboeuf et al. |
| 2016/0135431 A1 | 5/2016 | Siegel |
| 2016/0148086 A1 | 5/2016 | Clarke et al. |
| 2016/0150362 A1 | 5/2016 | Shaprio et al. |
| 2016/0151013 A1 | 6/2016 | Atallah et al. |
| 2016/0165851 A1 | 6/2016 | Harty et al. |
| 2016/0165852 A1 | 6/2016 | Goldfain |
| 2016/0166761 A1 | 6/2016 | Piehl et al. |
| 2016/0198957 A1 | 7/2016 | Arditi et al. |
| 2016/0210841 A1 | 7/2016 | Huang et al. |
| 2016/0213317 A1 | 7/2016 | Richardson et al. |
| 2016/0259061 A1 | 9/2016 | Carter |
| 2016/0278712 A1 | 9/2016 | Sagara et al. |
| 2016/0286757 A1 | 10/2016 | Armstrong |
| 2016/0287108 A1 | 10/2016 | Wei et al. |
| 2016/0317049 A1 | 11/2016 | LeBoeuf et al. |
| 2016/0345881 A1 | 12/2016 | Sarantos et al. |
| 2016/0360733 A1 | 12/2016 | Triener |
| 2016/0367495 A1 | 12/2016 | Miller et al. |
| 2017/0000090 A1 | 1/2017 | Hall |
| 2017/0006836 A1 | 1/2017 | Torres |
| 2017/0042119 A1 | 2/2017 | Garrity |
| 2017/0067770 A1 | 3/2017 | Sun |
| 2017/0079247 A1 | 3/2017 | Womble et al. |
| 2017/0095206 A1 | 4/2017 | Leib et al. |
| 2017/0142937 A1 | 5/2017 | De Groot |
| 2017/0156288 A1 | 6/2017 | Singh |
| 2017/0164905 A1 | 6/2017 | Gumiero |
| 2017/0193208 A1 | 7/2017 | Ashley et al. |
| 2017/0196203 A1 | 7/2017 | Huisma et al. |
| 2017/0202185 A1 | 7/2017 | Trumbull et al. |
| 2017/0245797 A1 | 8/2017 | Quinn |
| 2017/0253330 A1 | 9/2017 | Saigh et al. |
| 2017/0258039 A1 | 9/2017 | Lauterbach |
| 2017/0272842 A1 | 9/2017 | Touma et al. |
| 2017/0280675 A1 | 10/2017 | MacNeil et al. |
| 2017/0280688 A1 | 10/2017 | Deliou et al. |
| 2017/0318781 A1 | 11/2017 | Rollins et al. |
| 2017/0360004 A1 | 12/2017 | Carver |
| 2017/0372583 A1 | 12/2017 | Lamkin et al. |
| 2018/0000045 A1 | 1/2018 | Bianchi et al. |
| 2018/0007863 A1 | 1/2018 | Bailey et al. |
| 2018/0014512 A1 | 1/2018 | Arabani et al. |
| 2018/0027772 A1 | 2/2018 | Gordon et al. |
| 2018/0055016 A1 | 3/2018 | Hsieh et al. |
| 2018/0064068 A1 | 3/2018 | McKee et al. |
| 2018/0070559 A1 | 3/2018 | So |
| 2018/0098522 A1 | 4/2018 | Steinfort |
| 2018/0110205 A1 | 4/2018 | Czarnecky et al. |
| 2018/0113498 A1 | 4/2018 | Cronin et al. |
| 2018/0131074 A1 | 5/2018 | Wilkinson et al. |
| 2018/0132455 A1 | 5/2018 | Pradeep et al. |
| 2018/0136307 A1 | 5/2018 | Turner et al. |
| 2018/0146645 A1 | 5/2018 | Arbel |
| 2018/0206455 A1 | 7/2018 | Thiex et al. |
| 2018/0242860 A1 | 8/2018 | Leboeuf et al. |
| 2018/0249683 A1 | 9/2018 | Borchersen et al. |
| 2018/0260976 A1 | 9/2018 | Watanabe et al. |
| 2018/0271058 A1 | 9/2018 | Valdez |
| 2018/0279582 A1 | 10/2018 | Yajima et al. |
| 2018/0288968 A1 | 10/2018 | Cisco et al. |
| 2018/0295809 A1 | 10/2018 | Yajima et al. |
| 2018/0303425 A1 | 10/2018 | Wordham et al. |
| 2018/0306910 A1 | 10/2018 | Morinaga |
| 2018/0310526 A1 | 11/2018 | Birch et al. |
| 2018/0325382 A1 | 11/2018 | Brandao et al. |
| 2018/0332989 A1 | 11/2018 | Chiu et al. |
| 2018/0333244 A1* | 11/2018 | Hanks ............... A61D 17/00 |
| 2019/0008118 A1 | 1/2019 | Keegan |
| 2019/0008124 A1 | 1/2019 | Komatsu et al. |
| 2019/0029226 A1 | 1/2019 | Triener |
| 2019/0053469 A1 | 2/2019 | Mardirossian |
| 2019/0053470 A1 | 2/2019 | Singh et al. |
| 2019/0059335 A1 | 2/2019 | Crider, Jr. et al. |
| 2019/0059337 A1 | 2/2019 | Robbins |
| 2019/0059741 A1 | 2/2019 | Crider, Jr. et al. |
| 2019/0069512 A1 | 3/2019 | Eriksson et al. |
| 2019/0075945 A1 | 3/2019 | Strassburger et al. |
| 2019/0082654 A1 | 3/2019 | Robbins |
| 2019/0090754 A1 | 3/2019 | Brandao et al. |
| 2019/0110433 A1 | 4/2019 | Myers |
| 2019/0110436 A1 | 4/2019 | Gardner et al. |
| 2019/0125509 A1 | 5/2019 | Hotchkin |
| 2019/0130728 A1 | 5/2019 | Struhsaker |
| 2019/0133086 A1 | 5/2019 | Katz et al. |
| 2019/0159428 A1* | 5/2019 | Bolen ............... A01K 11/008 |
| 2019/0166802 A1 | 6/2019 | Seltzer et al. |
| 2019/0183091 A1 | 6/2019 | Betts-Lacroix et al. |
| 2019/0183092 A1 | 6/2019 | Couse et al. |
| 2019/0208358 A1 | 7/2019 | de Barros Chapiewski et al. |
| 2019/0213860 A1 | 7/2019 | Shaprio et al. |
| 2019/0254599 A1 | 8/2019 | Young et al. |
| 2019/0287429 A1 | 9/2019 | Dawson et al. |
| 2019/0290133 A1 | 9/2019 | Crider et al. |
| 2019/0290847 A1 | 9/2019 | Veyrent et al. |
| 2019/0298226 A1 | 10/2019 | Filipowicz |
| 2019/0298924 A1 | 10/2019 | Gibson et al. |
| 2019/0327939 A1 | 10/2019 | Sharpe et al. |
| 2019/0335715 A1 | 11/2019 | Hicks |
| 2019/0350168 A1 | 11/2019 | Shi |
| 2019/0365324 A1 | 12/2019 | Chang |
| 2019/0373857 A1 | 12/2019 | Leigh-Lancaster et al. |
| 2019/0380311 A1* | 12/2019 | Crouthamel ......... A01K 29/005 |
| 2019/0385037 A1 | 12/2019 | Robadey et al. |
| 2019/0385332 A1 | 12/2019 | Yajima et al. |

(56) References Cited

U.S. PATENT DOCUMENTS

| | | |
|---|---|---|
| 2019/0387711 A1 | 12/2019 | Flennert et al. |
| 2020/0015740 A1 | 1/2020 | Alnofeli et al. |
| 2020/0037886 A1 | 2/2020 | Greer et al. |
| 2020/0068853 A1 | 3/2020 | Radovcic |
| 2020/0085019 A1 | 3/2020 | Gilbert et al. |
| 2020/0100463 A1 | 4/2020 | Rooda et al. |
| 2020/0107522 A1 | 4/2020 | Kersey et al. |
| 2020/0110946 A1 | 4/2020 | Kline et al. |
| 2020/0113728 A1 | 4/2020 | Spector et al. |
| 2020/0170222 A1 | 6/2020 | Gotts |
| 2020/0178504 A1 | 6/2020 | Moss et al. |
| 2020/0178505 A1 | 6/2020 | Womble et al. |
| 2020/0178800 A1 | 6/2020 | Geissler et al. |
| 2020/0205381 A1 | 7/2020 | Wernimont et al. |
| 2020/0229391 A1 | 7/2020 | De Groot |
| 2020/0229707 A1 | 7/2020 | Donnelly |
| 2020/0242551 A1 | 7/2020 | Lau et al. |
| 2020/0281151 A1 | 9/2020 | Schmidt |
| 2022/0020051 A1 | 1/2022 | Aruga et al. |

FOREIGN PATENT DOCUMENTS

| | | |
|---|---|---|
| AU | 2003238759 | 1/2004 |
| AU | 2004263067 | 2/2005 |
| AU | 2004305403 | 7/2005 |
| AU | 2011210083 | 8/2011 |
| AU | 2016266101 | 12/2016 |
| AU | 2017100469 | 5/2017 |
| AU | 2018220079 | 9/2018 |
| BR | 8701673 | 3/2009 |
| BR | 11201201890 | 1/2011 |
| CA | 2267812 | 10/2000 |
| CA | 2493331 | 1/2005 |
| CA | 2788153 | 8/2011 |
| CA | 2880138 | 2/2013 |
| CA | 2858905 | 10/2013 |
| CA | 2875637 | 1/2014 |
| CA | 2875578 | 12/2014 |
| CA | 2915843 | 12/2014 |
| CA | 2990620 | 12/2016 |
| CA | 2916286 | 6/2017 |
| CA | 3007296 | 6/2017 |
| CN | 1989895 | 7/2007 |
| CN | 201171316 | 12/2008 |
| CN | 101578516 | 11/2009 |
| CN | 101816290 | 9/2010 |
| CN | 101875975 | 11/2010 |
| CN | 101875976 | 11/2010 |
| CN | 102781225 | 1/2011 |
| CN | 102142116 | 8/2011 |
| CN | 102485892 | 6/2012 |
| CN | 102682322 | 9/2012 |
| CN | 203313865 | 12/2013 |
| CN | 203689049 | 2/2014 |
| CN | 203523519 | 4/2014 |
| CN | 204047531 | 8/2014 |
| CN | 204305813 | 5/2015 |
| CN | 204331349 | 5/2015 |
| CN | 105191817 | 12/2015 |
| CN | 106125648 | 11/2016 |
| CN | 106168670 A | 11/2016 |
| CN | 106172068 | 12/2016 |
| CN | 106197675 | 12/2016 |
| CN | 106719037 | 2/2017 |
| CN | 205919898 | 2/2017 |
| CN | 106469319 A | 3/2017 |
| CN | 106472347 | 3/2017 |
| CN | 106845598 | 6/2017 |
| CN | 206431665 | 8/2017 |
| CN | 107201409 | 9/2017 |
| CN | 207201674 | 9/2017 |
| CN | 107251851 | 10/2017 |
| CN | 107667898 | 2/2018 |
| CN | 108353810 | 2/2018 |
| CN | 207100094 | 3/2018 |
| CN | 207249710 | 4/2018 |
| CN | 108651301 | 5/2018 |
| CN | 108656996 | 5/2018 |
| CN | 108684549 | 5/2018 |
| CN | 108118096 | 6/2018 |
| CN | 108308055 | 7/2018 |
| CN | 109006541 | 8/2018 |
| CN | 109008529 | 8/2018 |
| CN | 108617533 | 10/2018 |
| CN | 108717668 | 10/2018 |
| CN | 108766586 | 11/2018 |
| CN | 109006550 | 12/2018 |
| CN | 208273869 | 12/2018 |
| CN | 109355402 | 2/2019 |
| CN | 109937904 | 3/2019 |
| CN | 109937905 | 3/2019 |
| CN | 109823691 | 5/2019 |
| CN | 110073995 | 5/2019 |
| CN | 110059781 | 7/2019 |
| CN | 110106261 | 8/2019 |
| CN | 110106262 | 8/2019 |
| CN | 110506656 | 11/2019 |
| CN | 210076292 | 2/2020 |
| CN | 108875647 B | 8/2021 |
| DE | 633742 | 8/1936 |
| DE | 2850438 | 5/1980 |
| DE | 19629166 | 2/1997 |
| DE | 19826348 | 6/1998 |
| DE | 29906146 | 6/1999 |
| DE | 19911766 | 9/2000 |
| DE | 20018364 | 1/2001 |
| DE | 10001176 | 5/2001 |
| DE | 10200402797 8 | 12/2005 |
| DE | 202010008325 | 2/2012 |
| DE | 20201301107 5 | 1/2014 |
| DE | 202016101289 | 4/2016 |
| DK | 140001 | 11/1979 |
| EP | 55127 | 6/1982 |
| EP | 125915 | 11/1984 |
| EP | 0499428 | 8/1992 |
| EP | 513525 | 11/1992 |
| EP | 743043 | 11/1996 |
| EP | 938841 | 2/1998 |
| EP | 898449 | 3/1999 |
| EP | 1076485 | 2/2001 |
| EP | 1445723 | 8/2004 |
| EP | 1479338 | 11/2004 |
| EP | 1521208 | 4/2005 |
| EP | 1907816 | 4/2008 |
| EP | 1961294 | 8/2008 |
| EP | 2028931 | 3/2009 |
| EP | 2172878 | 4/2010 |
| EP | 2453733 | 5/2012 |
| EP | 2465344 | 6/2012 |
| EP | 2488237 | 8/2012 |
| EP | 2528431 | 12/2012 |
| EP | 2534945 | 12/2012 |
| EP | 2657889 | 10/2013 |
| EP | 2664234 | 11/2013 |
| EP | 2728995 | 5/2014 |
| EP | 2879615 | 6/2015 |
| EP | 2955998 | 12/2015 |
| EP | 3153098 | 4/2017 |
| EP | 3164855 | 5/2017 |
| EP | 3210531 | 8/2017 |
| EP | 3217566 | 9/2017 |
| EP | 3218865 | 9/2017 |
| EP | 3225106 | 10/2017 |
| EP | 3316680 | 5/2018 |
| EP | 3335549 A1 | 6/2018 |
| EP | 3346422 | 7/2018 |
| EP | 3385886 | 10/2018 |
| EP | 3593634 | 1/2020 |
| EP | 3627856 | 3/2020 |
| EP | 3660855 | 6/2020 |
| EP | 4001951 A1 | 5/2022 |
| ES | 2046912 | 2/1994 |
| ES | 2206009 | 5/2004 |
| ES | 2215152 | 10/2004 |

(56) References Cited

FOREIGN PATENT DOCUMENTS

| | | |
|---|---|---|
| ES | 1072416 | 7/2010 |
| ES | 2391341 | 11/2012 |
| ES | 1194609 | 10/2017 |
| FI | 20165318 | 6/2017 |
| FR | 2106705 | 5/1972 |
| FR | 2297565 | 8/1976 |
| FR | 2342024 | 1/1983 |
| FR | 2601848 | 1/1988 |
| FR | 2779153 | 12/1999 |
| FR | 2834521 | 7/2003 |
| FR | 2964777 | 3/2012 |
| FR | 3046332 | 1/2016 |
| FR | 3024653 | 2/2016 |
| FR | 3022033 B1 | 10/2017 |
| FR | 3085249 | 9/2018 |
| GB | 588870 | 6/1947 |
| GB | 641394 | 8/1950 |
| GB | 865164 | 4/1961 |
| GB | 1072971 | 6/1967 |
| GB | 1267830 | 3/1972 |
| GB | 1415650 | 11/1975 |
| GB | 2067121 | 7/1981 |
| GB | 2055670 | 7/1983 |
| GB | 2114045 | 8/1983 |
| GB | 2125343 | 3/1984 |
| GB | 2142812 | 1/1985 |
| GB | 2354129 B | 5/2001 |
| GB | 2392138 | 2/2004 |
| GB | 2469326 | 10/2010 |
| GB | 2554636 | 9/2016 |
| GB | 2570340 | 7/2019 |
| GB | 2571404 | 8/2019 |
| IN | 201103443 | 12/2011 |
| IN | 200802272 | 6/2016 |
| JP | 57173562 | 11/1982 |
| JP | 7177832 | 7/1995 |
| JP | 2001178692 | 7/2001 |
| JP | 2004292151 | 10/2004 |
| JP | 2005102959 | 4/2005 |
| JP | 5659243 | 1/2011 |
| JP | 2011067178 | 4/2011 |
| JP | 2011087657 | 5/2011 |
| JP | 2013247941 | 6/2012 |
| JP | 2017112857 | 6/2017 |
| JP | 2017002170 | 4/2018 |
| KR | 2003061157 | 7/2003 |
| KR | 2005046330 | 5/2005 |
| KR | 780449 | 11/2007 |
| KR | 20090076717 A | 7/2009 |
| KR | 101747418 | 1/2011 |
| KR | 20130019970 | 2/2013 |
| KR | 20130057683 | 6/2013 |
| KR | 2013138899 | 12/2013 |
| KR | 20160144866 A | 12/2016 |
| KR | 2019061805 | 11/2017 |
| KR | 101827311 | 2/2018 |
| KR | 20180035537 | 4/2018 |
| KR | 2018109451 | 10/2018 |
| KR | 20190081598 | 7/2019 |
| KR | 2019091708 | 8/2019 |
| MX | 9600754 | 2/1997 |
| MX | 356331 | 1/2011 |
| NL | 2017104 | 1/2018 |
| NL | 2019186 | 1/2019 |
| NL | 2020275 | 7/2019 |
| NZ | 198486 | 5/1986 |
| NZ | 199494 | 7/1986 |
| NZ | 203924 | 10/1986 |
| NZ | 335702 | 3/2001 |
| NZ | 507129 | 8/2002 |
| NZ | 582984 | 1/2011 |
| RU | 2178711 | 1/2002 |
| RU | 2265324 | 12/2005 |
| SE | 4567 | 3/1893 |
| SE | 5549 | 4/1894 |
| SE | 123213 | 11/1948 |
| SE | 188102 | 3/1964 |
| SU | 1766336 | 10/1992 |
| WO | 1984000468 | 2/1984 |
| WO | 1991011956 | 8/1991 |
| WO | 199302549 | 2/1993 |
| WO | 199822028 | 5/1998 |
| WO | 1998039475 | 9/1998 |
| WO | 1999017658 | 4/1999 |
| WO | 2000062263 | 4/1999 |
| WO | 9945761 | 9/1999 |
| WO | 2000013393 | 3/2000 |
| WO | 2000061802 | 10/2000 |
| WO | 2001033950 | 5/2001 |
| WO | 2001087054 | 11/2001 |
| WO | 2002031629 | 4/2002 |
| WO | 2002085106 | 10/2002 |
| WO | 2003001180 | 1/2003 |
| WO | 2004092920 | 3/2003 |
| WO | 2003087765 | 10/2003 |
| WO | 2003094605 | 11/2003 |
| WO | 2004015655 | 2/2004 |
| WO | 2005104775 | 4/2004 |
| WO | 2006078943 | 1/2005 |
| WO | 2005034617 A1 | 4/2005 |
| WO | 2005104930 | 4/2005 |
| WO | 2005073408 | 8/2005 |
| WO | 2005082132 A2 | 9/2005 |
| WO | 2006021855 | 3/2006 |
| WO | 20060036567 A1 | 4/2006 |
| WO | 2006134197 | 12/2006 |
| WO | 2006135265 | 12/2006 |
| WO | 2007034211 | 3/2007 |
| WO | 2007095684 | 8/2007 |
| WO | 2007122375 | 11/2007 |
| WO | 200801803 A2 | 2/2008 |
| WO | 2008033042 | 3/2008 |
| WO | 2008041839 A1 | 4/2008 |
| WO | 2008052298 | 5/2008 |
| WO | 2008075974 | 6/2008 |
| WO | 2008108667 A1 | 9/2008 |
| WO | WO 2008/108667 | 9/2008 |
| WO | 2010091686 | 12/2008 |
| WO | 2009034497 | 3/2009 |
| WO | 2009062249 | 5/2009 |
| WO | 2009076325 | 6/2009 |
| WO | 2009089215 | 7/2009 |
| WO | 2009117764 | 10/2009 |
| WO | 2009153779 | 12/2009 |
| WO | 2010008620 | 1/2010 |
| WO | 2010048753 | 5/2010 |
| WO | 2010053811 | 5/2010 |
| WO | 2010068713 | 6/2010 |
| WO | 2010140900 | 12/2010 |
| WO | 2012075480 | 12/2010 |
| WO | 2011034448 A1 | 3/2011 |
| WO | 2011039112 | 4/2011 |
| WO | 2011076886 | 6/2011 |
| WO | 2011154949 | 12/2011 |
| WO | 2012071670 | 6/2012 |
| WO | 2013008115 | 1/2013 |
| WO | 2013038326 | 3/2013 |
| WO | 2013082227 | 6/2013 |
| WO | 2015001537 | 7/2013 |
| WO | 2013118121 | 8/2013 |
| WO | 2015024050 | 8/2013 |
| WO | 2013179020 | 12/2013 |
| WO | 2013190423 | 12/2013 |
| WO | 2014020463 | 2/2014 |
| WO | 2014095759 | 6/2014 |
| WO | 2014107766 | 7/2014 |
| WO | 2014118788 | 8/2014 |
| WO | 2014125250 | 8/2014 |
| WO | 2016027271 | 8/2014 |
| WO | 2014140148 | 9/2014 |
| WO | 2014141084 | 9/2014 |
| WO | 2014194383 | 12/2014 |
| WO | 2014197631 | 12/2014 |
| WO | 2014199363 | 12/2014 |

(56) References Cited

FOREIGN PATENT DOCUMENTS

| | | |
|---|---|---|
| WO | 2015009167 | 1/2015 |
| WO | 2015009167 A1 | 1/2015 |
| WO | 2015030832 | 3/2015 |
| WO | 2015055709 | 4/2015 |
| WO | 2015086338 | 6/2015 |
| WO | 2016207844 | 6/2015 |
| WO | 2015107354 | 7/2015 |
| WO | 2017001717 | 7/2015 |
| WO | 2017031532 | 8/2015 |
| WO | 2015140486 | 9/2015 |
| WO | 2015158787 | 10/2015 |
| WO | 2015175686 | 11/2015 |
| WO | 2015176027 | 11/2015 |
| WO | 2015197385 | 12/2015 |
| WO | 2016037190 | 3/2016 |
| WO | 2017149049 | 3/2016 |
| WO | 2016053104 | 4/2016 |
| WO | 2016108187 | 7/2016 |
| WO | 2016166748 | 10/2016 |
| WO | 2017001538 | 1/2017 |
| WO | 2017037479 | 3/2017 |
| WO | 2017046996 A1 | 3/2017 |
| WO | 2017066813 | 4/2017 |
| WO | 2017089289 | 6/2017 |
| WO | 2017096256 | 6/2017 |
| WO | 2017027551 | 7/2017 |
| WO | 2017121834 | 7/2017 |
| WO | 2018006965 | 1/2018 |
| WO | 2018011736 | 1/2018 |
| WO | 2018019742 | 2/2018 |
| WO | 2020022543 | 7/2018 |
| WO | 2018172976 | 9/2018 |
| WO | 2020060248 | 9/2018 |
| WO | 2018203203 | 11/2018 |
| WO | 2019009717 | 1/2019 |
| WO | 2019025138 | 2/2019 |
| WO | WO 2019/040721 | 2/2019 |
| WO | 2019046216 | 3/2019 |
| WO | 2019048521 A1 | 3/2019 |
| WO | 2019058752 | 3/2019 |
| WO | 2019071222 | 4/2019 |
| WO | 2019132803 | 7/2019 |
| WO | 2019207561 | 10/2019 |
| WO | 2019226100 A1 | 11/2019 |
| WO | 2019235942 | 12/2019 |
| WO | 2019245978 | 12/2019 |
| WO | 2020003310 | 1/2020 |
| WO | 2020096528 | 5/2020 |
| WO | 2020140013 | 7/2020 |

OTHER PUBLICATIONS

International Preliminary Report on Patentability for International (PCT) Patent Application No. PCT/AU2019/050093, dated May 26, 2021, 54 pages.
Extended Search Report for European Patent Application No. 19914328.0, dated Jul. 28, 2022, 9 pages.
Christian Pahl, Eberhard Hartung, Anne Grothmann, Katrin Mahlkow-Nerge, Angelika Haeussermann, Rumination activity of dairy cows in the 24 hours before and after calving, Journal of Dairy Science, vol. 97, Issue 11, 2014, pp. 6935-6941.
Steensels, Machteld; Maltz, Ephraim; Bahr, Claudia; Berckmans, Daniel; Antler, Aharon; et al., Towards practical application of sensors for monitoring animal health: The effect of post-calving health problems on rumination duration, activity and milk yield,The Journal of Dairy Research; Cambridge vol. 84, Iss. 2, (May 2017): 132-138.
Clark, C., Lyons, N., Millapan, L., Talukder, S., Cronin, G., Kerrisk, K., & Garcia, S. (2015), Rumination and activity levels as predictors of calving for dairy cows, Animal, 9(4), 691-695.
K. Koyama, T. Koyama, M. Sugimoto, N. Kusakari, R. Miura, K. Yoshioka, M. Hirako, Prediction of calving time in Holstein dairy cows by monitoring the ventral tail base surface temperature, The Veterinary Journal, vol. 240, 2018, pp. 1-5, ISSN 1090-0233.
L. Calamari, N. Soriani, G. Panella, F. Petrera, A. Minuti, E. Trevisi, Rumination time around calving: An early signal to detect cows at greater risk of disease, Journal of Dairy Science, vol. 97, Issue 6, 2014, pp. 3635-3647, ISSN 0022-0302.
S. Benaissa, F.A.M. Tuyttens, D. Plets, J. Trogh, L. Martens, L. Vandaele, W. Joseph, B. Sonck, Calving and estrus detection in dairy cattle using a combination of indoor localization and accelerometer sensors, Computers and Electronics in Agriculture, vol. 168, 2020, 105153, ISSN 0168-1699.
N. Soriani, E. Trevisi, L. Calamari, Relationships between rumination time, metabolic conditions, and health status in dairy cows during the transition period, Journal of Animal Science, vol. 90, Issue 12, Dec. 2012, pp. 4544-4554.
The role of sensors, big data and machine learning in modern animal farming; Suresh Neethirajan; Received Jun. 2, 2020; Received in revised form Jun. 30, 2020; Accepted Jul. 3, 2020 Sensing and Bio-Sensing Research 29 (2020) 100367 2214-1804/ © 2020 The Author. Published by Elsevier B.V.
A Review on Determination of Computer Aid Diagnosis and/or Risk Factors Using Data Mining Methods in Veterinary Field Pinar CiHan, Erhan Göçke, Oya Kalipsiz; Tekirda Namk Kemal University, Çorlu Faculty of Engineering, Department of Computer Engineering, Tekirdağ, Turkey. 2019.
Big Data Analytics and Precision Animal Agriculture Symposium: Data to decisions B. J. White, D. E. Amrine, and R. L. Larson Beef Cattle Institute, Kansas State University, Manhattan, KS; © The Author(s) 2018. Published by Oxford University Press on behalf of American Society of Animal Science.
Gasteiner, J.; Boswerger, B.; Guggenberger, T., Practical use of a novel ruminal sensor on dairy farms, Praktische Tierarzt 2012 vol. 93 No. 8 pp. 730 . . . 739 ref.45.
Drying up Cows and the Effect of Different Methods Upon Milk Production; Ralph Wayne, C. H. Eckles, and W. E. Peterson; Division of Dairy Husbandry, University of Minnesota, St. Paul; Research—Article| vol. 16, Issue 1, p. 69-78, Jan. 1, 1933.
Eagan, B. H., B. Eagan, and A. Protopopova. "Behaviour Real-Time spatial tracking identification (BeRSTID) used for cat behaviour monitoring in an animal shelter." Scientific reports 12.1 (2022): 17585.
Garrido-Jurado, Sergio, et al. "Automatic generation and detection of highly reliable fiducialmarkers under occlusion." Pattern Recognition 47.6 (2014): 2280-2292.
Steve Nadis. "Invisible machine-readable labels that identify and track objects". Retrieved online on Sep. 3, 2023. URL: https://www.wevolver.com/article/invisible-machine-readable-labelsthat-identify-and-track-objects.
Prandini et al., Comparison of infectious bursa! disease live vaccines and a HVT-IBD vector vaccine and their effects on the immune system of commercial layer pullets. Avian Pathology. Mar. 17, 2016, vol. 45, pp. 114-125; abstract; p. 117, col. 1, para 2; p. 117, col. 2, para 1; p. 117, col. 2, para 2; p. 118, col. 1, para 2; p. 123, col. 1, para 1; p. 123, col. 1, para 2; p. 123, col. 2, para 3; Table 1.
Muniz et al., Molecular epidemiologic survey of infectious bursa! disease viruses in broiler farms raised under different vaccination programs. Journal of Applied Poultry Research. 2018, vol. 27, pp. 253-261; abstract.
Fenglin, Li, Practical Application and Practical Research of Computer Algorithms, Wuhan University Press,, N/A, 156-158, 2018.

* cited by examiner

FIG. 4

DETERMINING THE LOCATION OF AN ANIMAL

CROSS REFERENCE TO RELATED APPLICATIONS

This application is a national stage application under 35 U.S.C. 371 and claims the benefit of PCT Application No. PCT/AU2019/050093 having an international filing date of 8 Feb. 2019, which designated the United States, the contents of which are incorporated herein by reference in its entirety.

FIELD

This relates to determining the location of an animal.

BACKGROUND

Electronic animal identification tags can be used to identify animals. A tag is securely attached to an animal, often to the animal's ear. By reading the tag, the animal can be uniquely identified.

SUMMARY

In a first example embodiment, there is provided a method, comprising: receiving a first reading of an electronic animal identification tag attached to an animal from a first electronic tag reader; calculating a received signal strength indicator (RSSI) for the first reading; and determining a location of the animal based on the RSSI.

In a second example embodiment, there is provided a method, comprising: receiving a first reading of a first electronic animal identification tag attached to a first animal; calculating a received signal strength indicator (RSSI) for the first reading; receiving a second reading of a second electronic animal identification tag attached to a second animal; calculating a received signal strength indicator for the second reading; and determining the location of the first animal based on the RSSI of the first reading and the RSSI of the second reading.

BRIEF DESCRIPTION OF THE DRAWINGS

The invention is described by way of example with reference to the drawings, which show some embodiments of the invention. However, these are provided for illustration only. The invention is not limited to the particular details of the drawings and the corresponding description.

DETAILED DESCRIPTION

In some embodiments, there is provided a method for determining the location of an animal, and consequently, the location of an animal to which the tag is attached. A first read of an electronic tag attached to the animal is received by a first tag reader. An RSSI for the first read is calculated. A location of the electronic tag is then determined based on the RSSI. In other embodiments, there is provided a method for identifying an electronic animal identification tag is at a given location. A reader receives a first read of a first tag attached to a first animal and a second read of a second tag attached to a second animal. Based on the RSSI of each of the reads, the location of the first animal can be derived (at least relative to the second animal).

Using the RSSI allows a tag to be associated with a location. In different cases, this may enable a location of a particular animal to be identified, or an animal at a particular location to be identified.

For example, some stockyards have multiple races at an entrance or exit, and each race has a reader to read the tags of the animals passing through. Different animals proceed down the various races in parallel. This improves throughput, compared to having a single entrance or exit. However, because the races are close together, there is a risk of cross-read: that is, a reader may read a tag of an animal in a neighbouring race. This can make it difficult to determine which race an animal passed through. However, the RSSI of a read of an electronic animal identification tag tends to decrease over distance, so an RSSI of a reading from a reader close to the tag tends to be higher than a reading from a reader further from the tag. When an animal passes through a race, the tag of that animal should be closer to that race's reader than to any other race's reader. Thus the RSSI can be used to determine the location of the tag, and consequently the location of the animal to which the tag is attached.

Determining the Location of an Animal: First Embodiment

Figure 1:
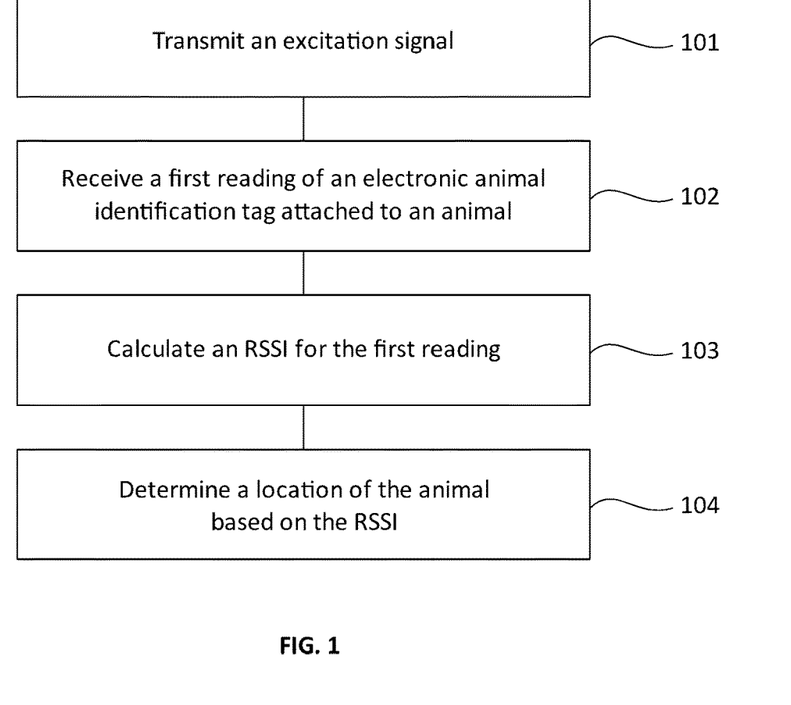
FIG. 1 shows an example method for determining the location of an animal according to a first embodiment.

FIG. 1 shows an example method for determining the location of an animal. This method is performed using a system comprising at least one electronic tag reader.

At step 101, an electronic tag reader transmits an excitation signal. The purpose of the excitation signal is to energise an electronic animal identification tag attached to an animal. The excitation signal may be generated periodically, such as every 100 ms, and may last for a predetermined portion of the period, such as 40% of the period.

At step 102, an electronic tag reader (which may be the same electronic tag reader that performed step 101) receives a first reading of an electronic animal identification tag. This reading comprises an identifier, such as a 96-bit electronic product code. The purpose of the identifier is to uniquely identify the animal to which it is attached. For example, if multiple electronic animal identification tags are attached to the same animal, each tag may have the same identifier.

At step 103, a received signal strength indicator (RSSI) is calculated for the reading. This may be performed by the electronic tag reader which performed step 102, or by a separate controller. The RSSI reflects the strength of the signal received from the tag. A greater signal strength leads to a higher RSSI. The RSSI may be computed as a function of the power level (such as in milliwatts or decibels with reference to one milliwatt) of the signal. The RSSI tends to vary by distance. Thus, all things being equal, a tag that is closer to the reader will tend to have a higher RSSI than a tag further from the reader.

In some cases, the RSSI is a relative figure, such as a signal strength relative to the average signal strength received by the reader (potentially over recent period). In such a case, a positive RSSI may mean that the signal strength of a received reading is greater than average.

At step 104, a location of the animal is determined based on the RSSI. This may be performed by a controller.

A location may be a relatively coarse area, such as a pen within a stockyard or a race in a multiple-race tag reader system. In some cases, these are associated with one of more readers. For example, each pen or race may have a corresponding reader.

When one or more readings of a tag from a single reader are available, the RSSI of the one or more readings may determine whether that tag is in a location corresponding to that reader. In some cases, if the RSSI of at least one reading is above a threshold value, then the tag is determined to be in that location. This threshold value may be determined based on a desired threshold distance. Since a greater RSSI tends to mean that the tag is close to the reader, a higher threshold tends to provide a positive determination only if the tag is in a closer proximity to the reader.

In other cases, the RSSI may be used to approximate a distance from the reader. RSSI tends to correlate with the distance of the tag from the reader. By using this correlation, an approximate distance from the reader can be calculated. For example, this may use a model trained on sample RSSI values and corresponding distances.

In this way, the usage of RSSI may result in a more accurate determination of the location of an electronic animal identification tag, and consequently of the location of an animal.

When one or more readings are available from each of multiple readers, and each reader is associated with a different location, the RSSI may be used to determine which of the locations the tag is in. In some cases, the location is determined on the basis of the reading with the highest RSSI only.

However, in some cases, accuracy may be improved by determining the location based on multiple readings. Thus, each of the readings may be considered together to determine the location.

For example, if readings are received from multiple readers in a sequence, the RSSI may form a curve having its maximum corresponding to a reader in the centre of the sequence of readers. In this case, the location of the tag may be the location of the centre reader.

In some cases, the determination of location occurs in real time. This may be useful when certain parts of a reader system are automatically controlled on the basis of the reading. In some arrangements, an animal may enter a race which a closed egress gate. When the animal's tag has been read, the corresponding gate is opened to allow the animal to exit the race. Such a system requires that the location of the electronic tag be determined in real time (that is, with a lag of less than a few seconds) in order for the system to operate efficiently.

In some cases, this occurs substantially after the reading was received. Each reading may be stored. These may be stored locally, on a memory of the reader. Additionally or alternatively, the readings may be sent to a remote device, such as to a controller. The remote device may receive readings from multiple readers, and can determine a location based on the multiple readings.

For example, after all animals have passed through a reader system with multiple races, the readings may be analysed to determine the paths of the animals through the system, and in particular, which race an animal passed through.

Behaviour and Movement

The techniques noted above may be used to determine a location of a tag (and thus of the animal to which the tag is attached).

In some cases, further information may be determined based on the RSSI.

Tags are often attached to the head of the animal (such as the ear). The RSSI therefore tends to correlate to the distance of the head of the animal from the reader.

In some cases, this can be used to determine a behaviour of the animal, such as whether an animal is likely to have placed its head in a particular location like a feeding trough or water point. If a reader is placed in or below the location, the RSSI will tend to increase as the animal drops its head (for example, to eat or drink). This can be used to assist in distinguishing when an animal is eating or drinking as opposed to standing adjacent a feeding trough or water point.

In some embodiments, the location of a tag (and thus the animal) may be monitored over time. This can show changes in location, which can indicate a direction, path or movement. In this way, a series of readings may be able to track the movement of an animal through a reader system or other infrastructure.

Tag Reading System

One situation in which the approach noted above may be useful is an electronic tag reading system which has multiple races. This may be provided at the entrance or exit to different areas within a stockyard or pasture, or when loading the animals to or from a transport such as a truck. Multiple races are used to increase the throughput. They may also be used to separate a group of animals into separate areas, where a first race leads to a first area and a second race leads to a second area.

When a single race is provided, it is relatively simple to determine a location of an animal in the tag reading system: it must be in the single race. However, where there are multiple races, this is no longer accurate: a reader in a first race may inadvertently read a tag on an animal in a second race. These "cross-reads" mean that a reading at a reader in a particular location may not correspond directly to the location of the animal. It can therefore be useful to determine the location (that is, which race) of an animal passing through a tag reading system.

Figure 2:
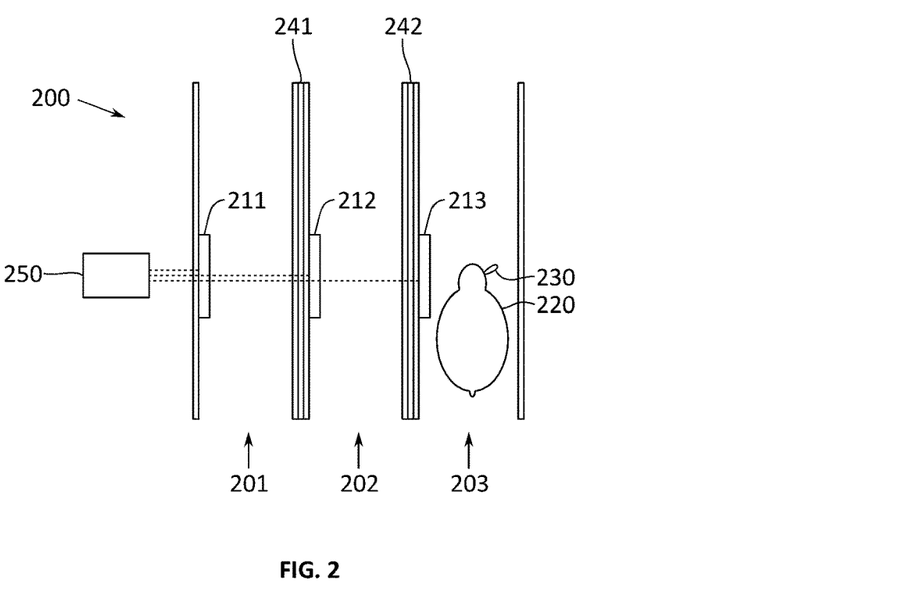
FIG. 2 shows an animal tag reading system which can use the method of FIG. 1.

FIG. 2 shows an example tag reading system 200 in which three races 201, 202, 203 are provided in sequence. Each race 201, 202, 203 has a pair of opposing walls which define a path through the race 201, 202, 203. A wall may be shared with a neighbouring race 201, 202, 203 in some cases. The width of each race 201, 202, 203 may be only slightly greater than the expected maximum width of the animals, to encourage animals to pass through in a single file, as this may increase the accuracy of readings of tags.

One or more readers 211, 212, 213 are associated with each race. Each reader 211, 212, 213 may be mounted in the walls of each corresponding race 201, 202, 203. For example, a reader may have coils which pass through both opposing walls of the correspondence. This may be configured to provide a generally uniform field through the race 201, 202, 203, such as by operating in a Helmholtz configuration.

In use, an animal enters through an entrance into a race 201, 202, 203, passes the corresponding reader 211, 212, 213, and exits through an exit of the race 201, 202, 203. As the animal passes through, one or more of the readers 211, 212, 213 generate one or more readings of the animal's tag. Each of these readings may have a different RSSI, depending on the distance of the animal's tag from the respective reader.

For example, as depicted in FIG. 2, animal 220 is within race 203. The readers 211, 212, and 213 each receive a reading from the electronic animal identification tag 230 attached to the ear of the animal 220. Reader 213 may obtain a first reading having a relatively high RSSI, since the distance between the animal 25 identification tag 230 and the reader 213 is relatively low. Reader 212 may obtain a second reading having a relatively low RSSI, since the distance between the animal identification tag 230 and the reader 212 is relatively high. Reader 211 may not obtain a reading at all.

These readings may be sent to a controller 250, either by wire or wirelessly. The controller 250 can analyse the readings in real time or after some delay to determine the location of a tag, and thus the location of the animal to which the tag is attached.

Thus by using the RSSI to distinguish between readings of the same tag, it is possible to determine which location (that is, which race) an animal is in.

In some cases, a tag reading system may include physical structures to increase the attenuation of the signal. This can further decrease the RSSI over distance, and therefore may increase the overall accuracy of the determination of a location.

For example, a shield 241, 242 may be provided between neighbouring races. So shield 241 may be located between races 201 and 202 and shield 242 may be located between races 202 and 203. The shield may be configured to impede electromagnetic and/or radio frequency signals, and therefore may attenuate the strength of signals passing between the races. For example, a metal mesh, such as of copper or steel, may be located on or in a wall of the corresponding race. Thus, a cross-read (that is, a reading by a reader in a first race of a tag in a second race) may result in a significantly lower RSSI than a reading of a tag in the same race.

Determining the Location of Animal: Second Embodiment

Figure 3:
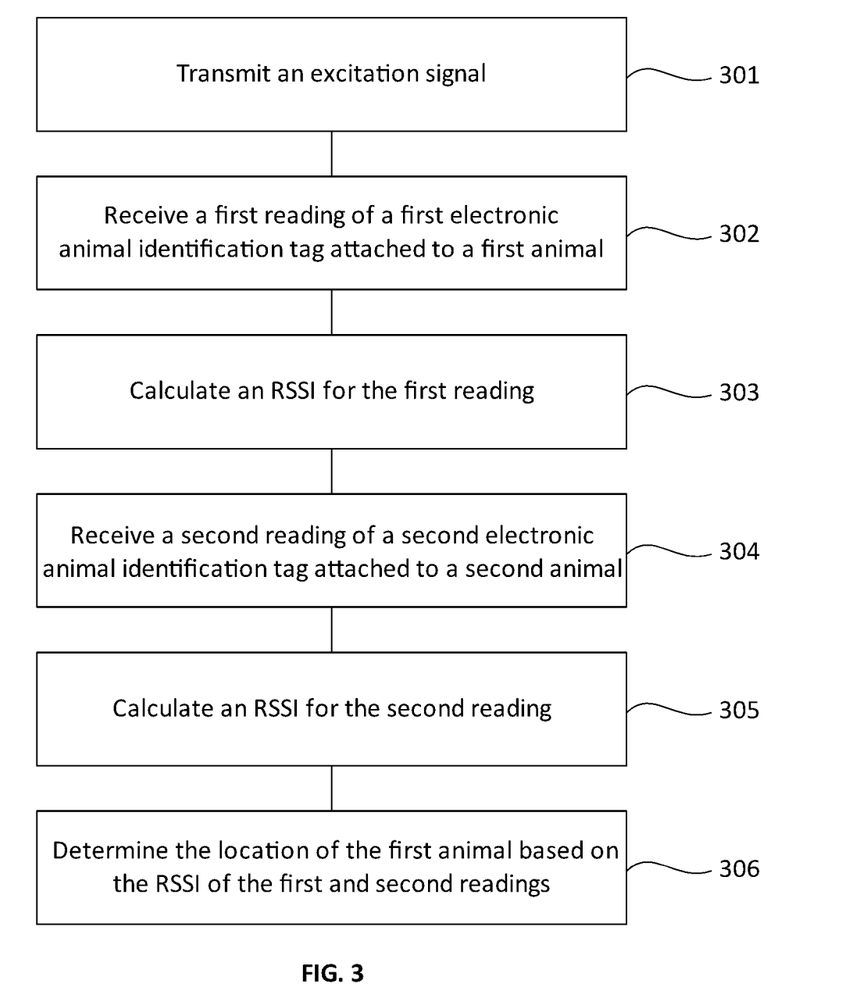
FIG. 3 shows an example method for determining the location of an animal according to a second embodiment.

FIG. 3 shows an example method for determining the location of an animal according to a second embodiment. This method is performed using a system comprising at least one electronic tag reader. The electronic tag reader is configured to read an animal at a particular location. This location is known as a read zone. Alternatively, the location may be relative to other animals. For example, the location of a first animal may be ahead of a second animal in a sequence.

At step 301, an electronic tag reader transmits an excitation signal. The purpose of the excitation signal is to energise an electronic animal identification tag attached to an animal, such as an animal within a read zone. The excitation signal may be generated periodically, such as every 100 ms, and may last for a predetermined portion of the period, such as 40% of the period.

At step 302, an electronic tag reader (which may be the same electronic tag reader that performed step 101) receives a first reading of a first electronic animal identification tag. This reading comprises a first identifier, such as a 96-bit electronic product code. The purpose of the identifier is to uniquely identify the animal to which it is attached. For example, if multiple electronic animal identification tags are attached to the same animal, each tag may have the same identifier.

At step 303, a received signal strength indicator (RSSI) is calculated for the first reading. This may be performed by the electronic tag reader which performed step 302, or by a separate controller. The RSSI reflects the strength of the signal received from the tag. A greater signal strength leads to a higher RSSI. The RSSI may be computed as a function of the power level (such as in milliwatts or decibels with reference to one milliwatt) of the signal. The RSSI tends to vary by distance. Thus, all things being equal, a tag that is closer to the reader will tend to have a higher RSSI than a tag further from the reader.

At step 304, an electronic tag reader (which may be the same electronic tag reader that performed step 102) receives a second reading of a second electronic animal identification tag. This may occur in the same manner as step 302, and may occur at the same time as step 302. The second reading comprises a second identifier, which is different from the first identifier.

Because two (or more) readings were received, each having a different identifier, it is unclear which animal is within the read zone. This may occur when animals are spaced closely together or otherwise a signal from the second tag is conducted further than would otherwise be expected due to infrastructure or other environmental conditions.

At step 305, an RSSI is calculated for the second reading. This may be performed by the electronic tag reader which performed step 304, or by a separate controller. This may otherwise be performed in the same manner as step 303 and may occur at the same time as step 305.

At step 306, the location of the first animal is determined based on the RSSI of the first reading and the RSSI of the second reading.

For example, the first animal may be determined to be "in the read zone" or "outside of the read zone". Alternatively, the first animal may be determined to be ahead of the second animal.

In some cases, this may occur by selecting the reading with the highest RSSI. Because the reader is configured to read from the read zone (and thus may be close to the read zone), a reading from a tag in the read zone may be expected to have a higher RSSI than a tag outside the read zone. Thus if the first reading has the highest RSSI, then the first animal may be determined to be in the read zone. Otherwise, the first animal may be determined to be outside of the read zone.

Where there are multiple readings over time, this may assist in determining the location of the first animal relative the second animal. For example, if multiple readings are taken at a regular period, then the RSSI of the readings of a particular tag may be expected to rise as it approaches the reader, and then fall as it moves away from the reader. The RSSI may therefore form a curve of RSSI over time. By comparing the curve of a first tag and the curve of a second tag with respect to time, it can be possible to determine the sequence of animals passing the reader. That is, the curve having an earlier maximum relates to an animal appearing earlier in the sequence. Thus the relative location of an animal can be determined.

In this way, the location of an animal can be determined using RSSI of one or more readings. This allows the identification of an animal within a predetermined location, such as a read zone.

Tag Reading System

One situation in which the method noted above may be useful is a tag reading system which has a sequence of animals passing a set point.

For example, in an abattoir, the animals are hung on regularly spaced hooks. These pass a read zone at a predetermined location for determining which animals are moving through that point of the abattoir.

In some cases, the tags of two or more animals are read at the same time. This can occur when the excitation signal from a reader is sufficiently strong to energise multiple tags. It may also be affected by infrastructure conducting the signal further than would be expected.

When readings are received from multiple tags, there is a risk that an animal will be fail to be identified correctly. This can affect the traceability of the animals, where a first animal is identified by the reader as a second animal.

In addition, in some cases a sequence of animals may proceed through a read zone only when the current animal in the read zone has been identified. Such a system requires a accurate identification of animals for the system to function efficiently.

Figure 4:
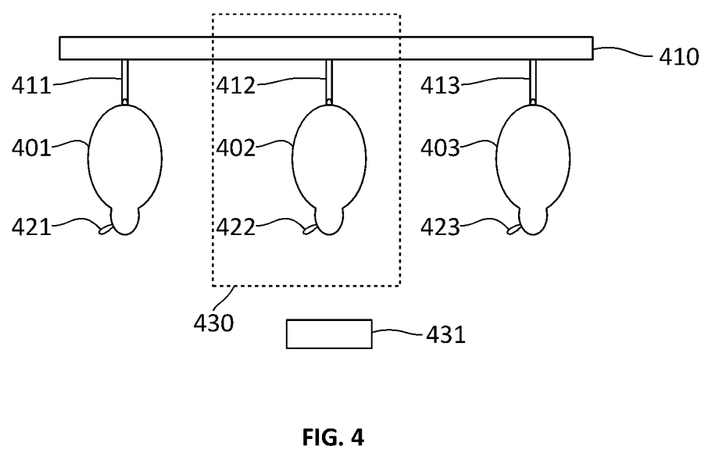
FIG. 4 shows an animal tag reading system which can use the method of FIG. 3.

FIG. 4 shows an example tag reading system which may use the method of FIG. 3.

Animals 401, 402, 403 are each hung on a respective hook 411, 412, 413, which in turn are connected to a belt 410. The hooks 411, 412, 413 are equally spaced. An electronic animal identification tag 421, 422, 423 is attached to each animal 401, 402, 403. As the belt moves forward, each animal passes through a read zone 430 having a reader 431.

In use, the belt 410 may pause until a successful reading is received from a tag in the read zone. The reading corresponding to the tag in the read zone may be identified by determining the location of each tag from which a reading is received.

Once a successful reading is received, the belt 410 may move so a subsequent animal is in the read zone.

Additionally or alternatively, the identification may be used to provide a record of how an animal has been routed. In use, animals may be moved in different direction, for example for sending to different destinations. By noting animals at multiple read zones, the path of each animal can be determined. This provides for traceability of animals through the abattoir.

Predictive Algorithm

As noted above, the location may be determined solely on the basis of RSSI. However, in some cases, the location may be determined based on RSSI in combination with one or more other factors.

In some cases, the physical distance or configuration of the readers or other infrastructure may be incorporated into the determination. For example, certain metalwork in the infrastructure may conduct signals in a particular way. This may lead to the RSSI of a reading from a distant reader being higher than would be expected from the distance alone.

In some cases the output of one or more physical sensors, such as a weight sensor or motion sensor, may be used to indicate when an animal is within a particular location. If a reading from a particular reader indicates a high RSSI, this may ordinarily suggest that the animal is in the corresponding location. However, if a weight sensor indicates that there is no animal there, then the animal must be in a different location.

In some cases, a previous location of the tag and/or a time since a last location determination may be used to influence a determination of the position. If an animal was previously determined to be in a first location, it is unlikely the animal would then be in a second location which is physically inaccessible from the first location. Likewise, the expected rate of movement of an animal may restrict the range of possible locations for an animal based on a previous location.

In some cases, the reliance placed on the data from certain readers may be weighted differently. Where there are a sequence of readers, a greater weight may be placed on the readers on the outside of the sequence. This is because the outside readers are less likely to get cross-reads, since there is only one neighbouring reader. In other situations, a reader may be weighted based on a reliability: due to technical or structural differences, some readers may tend to provide more accurate readings.

In practice, one or more of these factors may be provided, in combination with the RSSI, to a predictive algorithm in order to determine a location. The use of multiple factors may increase the accuracy of the determination of the location.

In some cases, the predictive algorithm may comprise a model developed using artificial intelligence. For example, a neural network may be developed and trained based on a training set comprising sample data. During use, the RSSI and other data may be provided to the model, which then outputs a determined location on the basis of the trained neural network.

In some cases, multiple models are available, and are selected based on one or more criteria. A first model may be used in general cases, and a second model may be used when a predetermined amount of readings are received (such as more than 50 readings) or if readings are received from a predetermined number of different readers (such as more than three readers). The use of different models for determination at different times can increase the overall accuracy of the determination of location.

Interpretation

Two embodiments of a method for determining the location of an animal have been noted above. In some cases, these may be combined in a single implementation.

Where a series of steps has been described, these steps need not necessarily be performed in the stated order (unless context requires otherwise). That is, steps may be performed out of order or in parallel in different embodiments.

The term "comprises" and other grammatical forms is intended to have an inclusive meaning unless otherwise noted. That is, they should be taken to mean an inclusion of the listed components, and possibly of other non-specified components or elements.

The present invention has been illustrated by the description of some embodiments. While these embodiments have been described in detail, this should not be taken to restrict or limit the scope of the claims to those details. Additional advantages and modifications will readily appear to those skilled in the art. Therefore, the invention in its broader aspects is not limited to the specific details of the illustrative examples shown and described. Accordingly, modifications may be made to the details without departing from the spirit or scope of the general inventive concept.

The invention claimed is:

1. A method, comprising:
   (a) receiving, from a plurality of electronic tag readers located within a plurality of animal races, a plurality of readings of an electronic animal identification tag attached to an animal, wherein a given electronic tag reader of the plurality of electronic tag readers is allocated to a given race of the plurality of animal races, and wherein the readings of at least one electronic tag reader of the electronic tag readers is provided with a weight based on the electronic reader's reliability;

(b) calculating a received signal strength indicator (RSSI) for each of the plurality of readings; and (c) determining within which race, of the plurality of races, the animal attached to a given electronic animal identification tag is located;

wherein the determination is based, at least in part, on a combination of the weighted readings and the calculated received signal strength indicator.

2. The method of claim 1, wherein determining within which race the animal is located is further based on one or more of:

a configuration of the electronic tag readers;

a configuration of other infrastructure, other than the electronic tag readers;

the output of one or more physical sensors;

a previous location of the electronic animal identification tag; or a time since a last determination of the location of the animal.

3. The method of claim 1, wherein each reading of the plurality of readings comprises an animal identifier.

4. The method of claim 1, wherein a shield is provided between neighbouring races of the plurality of races.

5. The method of claim 1, wherein the plurality of races are in a multiple-race tag reader system, and wherein, after all animals have passed through the tag reader system, the readings are analysed to determine the race through which the animal passed.

6. The method of claim 1, wherein the readings are analysed after some delay to determine within which race, of the plurality of races, the animal attached to a given electronic animal identification tag is located.

7. The method of claim 1, wherein the determining within which race the animal is located is further based on a time since a last determination of the race of the animal.

8. The method of claim 1, wherein the weight is independent of the RSSIs.

9. The method of claim 1, wherein the reliability of a given reader is determined based on technical or structural differences between the plurality of electronic tag readers.

10. An electronic tag reading system, comprising:

a plurality of animal races;

a plurality of animals;

at least one electronic animal identification tag attached to each of the plurality of animals;

a plurality of electronic tag readers located within a the plurality of animal races, wherein a given electronic tag reader of the plurality of electronic tag readers is allocated to a given race of the plurality of animal races; and a controller communicatively connected to the plurality of electronic tag readers;

wherein the system is configured to perform a method comprising:

receiving, from the plurality of electronic tag readers, a plurality of readings of an electronic animal identification tag attached to the animal, wherein the readings of at least one electronic tag reader of the plurality of electronic tag readers is provided with a weight based on the electronic tag reader's reliability;

calculating a received signal strength indicator (RSSI) for each of the plurality of readings; and determining within which race of the plurality of races, the animal attached to a given electronic animal identification tag is located;

wherein the determination of which race is based, at least in part, on a combination of the weighted readings and the calculated received signal strength indicator.

11. The system of claim 10, wherein the reliability of a given reader is determined based on technical or structural differences between the plurality of electronic tag readers.

12. The system of claim 10, wherein the determination of within which race the animal is located is further based on one or more of:

a configuration of the electronic tag readers;

a configuration of other infrastructure, other than the electronic tag readers;

the output of one or more physical sensors;

a previous location of the electronic animal identification tag; or a time since a last determination of the location of the animal.

* * * * *